United States Patent Office

3,658,983
Patented Apr. 25, 1972

3,658,983
USE OF ISOMALTOL ESTERS, AS
ANTIMICROBIAL AGENTS
Robert P. Allingham, Groton, and John J. Beereboom,
Old Lyme, Conn., assignors to Pfizer Inc., New York,
N.Y.
No Drawing. Continuation-in-part of application Ser. No.
491,440, Sept. 29, 1965. This application Dec. 31, 1968,
Ser. No. 788,323
Int. Cl. A23b 7/00; A01n 3/00, 9/28
U.S. Cl. 424—45
14 Claims

ABSTRACT OF THE DISCLOSURE

The use of isomaltol, its esters and related compounds in inhibiting microbial growth, in preserving foodstuffs, and in the treatment of certain fungal infections. Novel esters of isomaltol are prepared.

CROSS-REFERENCE TO RELATED APPLICATION

This is a continuation-in-part application of copending application, Ser. No. 491,440, filed Sept. 29, 1965, and now abandoned.

BACKGROUND OF THE INVENTION

This invention relates to a method for inhibiting microbial growth by applying 2-acetyl-3-hydroxyfuran (isomaltol), various 2-acyl or 2-aroyl-3-hydroxy-5-methylfurans, and their salts and esters to a microbial habitat. This invention further relates to the use of these compounds in the preservation of fruits, vegetables, and various processed foods, such as animal feeds, cheeses and certain baked goods. This invention also relates to a method of alleviating the symptoms of athlete's foot by topical administration of the compounds of the present invention. Although many antimicrobial agents, such as fungicides, have been prepared and used in controlling microbial growth, many of these materials are not completely effective and others actually exhibit some toxic effects. The compounds described herein have been found to be extremely effective anti-microbial agents and at the same time they have not been found to be toxic at the concentration levels used.

Various harmful bacteria and fungi cause considerable economic losses in the wood, textile, leather, and food industries annually and the control of these microorganisms present formidable problems. In particular, fungal spoilage of fruits and vegetables is of constant concern to those in the agricultural and food industries. In the case of strawberries, the annual loss in shipment is about eighteen million dollars. While cold storage or freezing ordinarily preserves food for long periods, these are not always convenient, economical or effective methods of preservation. Examples of foods where freezing or cold storage is not entirely effective are fresh fruits and vegetables. When this type of food is shipped from California to New York, either in refrigerated cars or in a carbon dioxide atmosphere, a certain percentage of the shipment is lost due to spoilage.

Furthermore, man and other animals are also susceptible to many mycotic infections in which the skin, hair and nails are involved, e.g., athlete's foot. Athlete's foot is probably the most prevalent of the mycotic infections and it has been estimated that more than half the population of the United States will develop the infection some time during their lives. This infection is believed to be due to the Trichophyton fungi, in particular *T. mentagrophytes*. We have now found that topical application of the herein described compounds effectively alleviates the symptoms and sufferings caused by athlete's foot.

SUMMARY OF THE INVENTION

The present invention provides a method of inhibiting microbial growth which comprises applying to a microbial habitat a growth-inhibiting concentration of at least a compound selected from the group consisting of those having the formula:

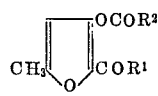

and

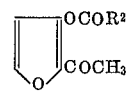

wherein $R^1$ is alkyl, aryl, arylalkyl or alkylaryl of up to 10 carbon atoms; and $R^2$ is hydrogen, alkyl, aryl, arylalkyl or alkylaryl of up to 10 carbon atoms.

This invention also provides a process for preserving processed foodstuffs, fruits, and vegetables which comprises contacting them with an effective amount of at least one compound selected from the group given above.

This invention further provides a method of alleviating the symtoms of athlete's foot which comprises topically administering to an infected subject at least one compound selected from the group given above.

In addition, this invention also comprises the novel compounds

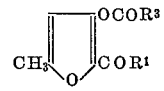

and

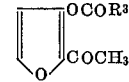

wherein $R^1$ and $R^3$ are each selected from the group consisting of alkyl, aryl, arylalkyl or alkylaryl of up to 10 carbon atoms and may be the same or different.

We have also found that various foodstuffs are protected from the growth of harmful microorganisms for extended periods of time when the compounds of the present invention are added to them. Thus, when these compounds are added to various types and forms of foodstuffs, in ranges from 0.01 to about 0.1 weight percent, these foods are preserved from the undesirable growth of microorganisms which spoil food. Of course, higher concentrations may be effectively used, but concentrations greater than the preferred range of from 0.01 to 0.1% based on the weight of foodstuffs tend to superimpose the flavor of isomaltol on the natural food flavor, which becomes objectionable at these higher concentrations. Indeed, the use of isomaltol has been considered as a flavoring agent for baked goods, such as bread and rolls, although normally at concentration levels above those envisaged in the present invention. See J. E. Hodge and H. A. Moser, Cereal Chemistry, 38, 221 (1961). We have found that foods containing small amounts of the compounds of the instant invention can be stored at room temperatures for much longer periods than untreated foods without becoming spoiled. Of course, freezing or storing at low temperatures will protect the foods treated according to the process of this invention for even longer periods. While the process of this invention is particularly valuable in preserving food at room temperature, it is also applicable for preserving foods at lower temperatures. In addition, where foods are stored at temperatures higher than room temperature, as for instance in warehouses or in shipping, the process of this invention greatly extends the storage life of foods and prevents spoilage.

The foodstuffs contemplated as preferred in the process of this invention and which we have most successfully preserved by the addition of the compounds of the instant invention are those where freezing and cold storage are not entirely effective or those foods whose flavor is lost on freezing.

DETAILED DESCRIPTION OF THE INVENTION

All of the compounds described in the present invention exhibit antimicrobial activity and are effective growth inhibitors of a wide variety of fungi, bacteria, and yeasts. In particular, these compounds are extremely effective fungicides. When used herein the term fungicidal is meant to include the destruction of fungi as well as the inhibition of their growth, i.e., fungistatic activity. It must be understood, however, that not all of the compounds of the present invention exhibit the same degree of antimicrobial effectiveness. The potency of any particular compound will depend upon such factors as the particular species of fungi involved and the concentration level at which the compound is used.

Of the compound described in the present invention, 2-acetyl-3-hydroxy-furan (isomaltol) and 2-acetyl-3-hydroxy-5-methylfuran have been described in the prior art. See for example K. Anderton and R. W. Rickards, J. Chem. Soc., 2543 (1965) and H. Takei et al., Bull. Chem. Soc., Japan 41, 1738 (1968). The remaining 2 - acyl and 2 - aroyl-3-hydroxy-5-methylfurans of the present invention are conveniently prepared according to the method of H. Takei et al. as described in the reference above.

The novel esters of these compounds are prepared according to conventional procedures well known to those skilled in the art. The preferred methods are reaction of the hydroxyfurans with an appropriate acid anhydride or acid chloride; however, other conventional ester syntheses well known to those skilled in the art can be used as well.

The corresponding non-toxic metal salts of the 3-hydroxyfurans described herein are also effective antimicrobial agents. Among the preferred salts are the magnesium, calcium, potassium, sodium, ammonium, aluminum, zinc, and iron salts. Various organic amine salts of these compounds can be used as well, e.g., sec. butylamine salt of isomaltol and 2-acetyl-3-hydroxy-5-methylfuran. These salts are readily prepared by treating an aqueous alcoholic solution of the 3-hydroxyfuran with an equivalent amount of an appropriate base and then evaporating or lyophilizing the reaction mixture.

The presently described compounds are effective growth inhibitors of a wide variety of fungi which are involved in the spoilage of such foods as cheeses, fruits, vegetables, and various processed foods and when applied to these products will prevent their spoilage.

There are several methods which we have found to be effective in applying the herein described compounds to foodstuffs. Applications by spraying the food or dipping it into solutions of the compound have been found to be convenient, effective and economical. In the case of processed foodstuffs such as animal feeds an effective amount of the compound can be admixed with the product.

An embodiment of the process of this invention as it relates to the preservation of fresh fruits, including berries, and vegetables comprises dipping said fruits, berries and vegetables in an aqueous solution of the compound, or in the case of a 3-hydroxyfuran one of its salts. Thus, a solution of 1% isomaltol or one of its salts has been found to be convenient for this purpose. The previously weighed foodstuffs is re-weighed to determine the wet pick-up of solution and is then dried, either at room temperature or at a higher temperature, with the aid of a compressed air stream. Concentrations of from 0.01 to 0.1 weight percent of the instant compounds are effectively applied in this manner. The foods so treated can then be stored at room temperature, frozen or put in cold storage areas. Another convenient method of applying these preservatives comprises spraying an aqueous solution of the compound on the fruits, berries or vegetables. For convenience and economy, a 1% solution can be effectively applied to large batches of fruit or vegetables in open containers with a hand sprayer. Of course, a compressed air or an electric sprayer is also useful. In the case of the 3-hydroxyfurans, a 10% aqueous emulsion of the sodium or potassium salt is most conveniently used. In this manner, the compounds can be applied to the foodstuffs in a single spraying. Where large quantities of foodstuffs are stored such as in railroad cars or commercial storage bins, the vapor phase method of preserving food is very convenient. The simplest method of vaporizing the desired compound is to drop aqueous solutions on a heated electrode within the sealed or semi-closed storage area. Of course, for commercial applications, such as for use in refrigerated railroad cars, the compound can be metered into the atmosphere as a vapor by a device such as the Tectrol™ apparatus made by the Whirlpool Corporation or a similar device. In this manner, a 0.1% concentration based on the weight of food in storage may be readily maintained in the atmosphere of the storage area. The use of such devices also allows the vapor to be used in conjunction with low oxygen concentrations. For example, the use of carbon dioxide as a preserving atmosphere and other methods for supplying such an atmosphere are well known in the food preserving and shipping trades.

Another method which we have found effective in applying the herein described compounds to foods, comprises applying solutions of them to wrapping papers, paper cartons or carton liners used for storing food. For this type of application, the packing papers or paper cartons are weighed and dipped in an aqueous solution of the compound, a 10% by weight concentration being usually preferred. The wet pick-up is determined and the paper is dried. The papers are then inserted into the cartons to give an effective concentration based on the weight of the foodstuff. The papers need not be in direct contact with the surface of the food to be effective. Similarly, the food may be placed in paper boxes treated with one of the herein described compounds.

A modification of the method for applying the compound to paper food wrappers and cartons which we have found effective in preserving foods, comprises milling the compound into a plastic film such as polyvinylidene chloride, polyethylene, polyvinyl chloride and the like. The procedures for preparing such films are well known in the plastics processing art. They comprise milling the granular resin on a 2- or 3-roll plastics mill or the like at a temperature of from about 250 to 340° F. depending on the type and form of the resin. The time required to obtain a plastic mass is usually from ½ to 2 min. The compound is then added to the resin on the rollers and is milled into the platsic. Usually, from 2 to 6 minutes on the rollers is sufficient to obtain thorough mixing for small batches. The rollers are then adjusted to the required film thickness and the film is sheeted off. Films of from 2 to 6 mils are obtained in this manner. Essentially the same procedure is used for obtaining larger batches of film using commercial extruders and mills. The clear plastic film so formed can then be used to wrap cakes, bread, dog food, fruits, either individually or packages, boxes of berries and the like.

The compounds of the present invention are also effective in preserving processed foods. By the term "processed foods" is meant those foods which are mixed or treated in some way prior to being sold. The processed foods which are most effectively preserved by the process of this invention are cheeses, animal foods, shredded coconut and the like. The processed foods can be treated with the presently described compounds in the same maner as were the fruits and vegetables. The compounds can also be directly incorporated into the finished food product.

In the case of a processed foodstuff we have found the optimum concentration of compound to foodstuff to be about 0.01 to 0.10% by weight, and in the case of fruits and vegetables the preferred concentration range is about 0.01 to 0.15% by weight.

As previously mentioned, the compounds described herein are also effective against various pathogenic microorganisms, in particular pathogenic fungi such as those belonging to the genus Trichophyton. Fungi belonging to the latter genus are believed responsible for various mycotic infections such as athlete's foot and accordingly, we have found the compounds of the present invention to be effective in alleviating the symptoms of the disease. When used to control athlete's foot, these compounds are applied in various topical formulations which include ointments, solutions, and dusting powders. The solutions are prepared preferably from such pharmaceutically acceptable solvents as ethanol, isopropanol, and aqueous solutions thereof. Nevertheless, solutions can also be prepared from mineral oil, glycerin and the like. The dusting powders are prepared from such well known excipients as talc, diatomaceous earth and other pharmaceutically acceptable solid adsorbents. A preferred method of application is a as a vapor. This can be conveniently accomplished by dispensing the compounds as aerosols.

When treating athlete's foot the compounds can be applied directly to the foot of the patient in the form of an ointment, dusting powder or vapor, or alternatively they can be applied to the patient's footwear.

The number of treatments will depend on the severity of the infection and would normally be determined by the treating physician.

The following examples are provided to illustrate further the present invention, but are not to be construed as limiting the scope thereof.

EXAMPLE I (A) Preparation of the sulfonium ylids

Using the procedures of B. M. Trost, J. Am. Chem. Soc., 89, 138 (1967), and G. B. Payne, J. Org. Chem., 32, 3351 (1967), the following sulfonium ylids are prepared:

$$(CH_3)_2S^+CH^--COR^1$$

$R^1$:
- $CH_3$—
- $C_2H_5$—
- $n\text{-}C_3H_7$—
- $i\text{-}C_3H_7$—
- $n\text{-}C_6H_{13}$—
- $n\text{-}C_{10}H_{21}$—
- $C_6H_5$—
- α-naphthyl—
- $C_6H_5CH_2$—
- $C_6H_5CH_2CH_2$—
- $p\text{-}CH_3C_6H_4CH_2CH_2$—
- 2,4,6-$(CH_3)_3C_6H_2$—
- $p\text{-}(CH_3)_2CHC_6H_4$—

(B) General procedure for the preparation of the 2-aroyl and 2-acyl-3-hydroxy-5-methylfurans About 0.10 mole of ketene dimer is added at room temperature under a nitrogen atmosphere to 300 ml. of an anhydrous benzene solution containing about 0.10 mole of one of the ylids listed in (A) above. The reaction mixture is refluxed for about ½ to 1 hour. When the evolution of dimethyl sulfide has ceased, the solvent is evaporated under reduced pressure and the crude 2-aroyl or 2-acyl-3-hydroxy-5-methylfuran is purified by adsorption chromatography on silica gel or alumina, followed by recrystallization from a suitable solvent. The compounds in the table below are prepared by means of this procedure:

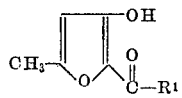

$R^1$:
- $CH_3$-
- $C_2H_5$-
- $n\text{-}C_3H_7$-
- $i\text{-}C_3H_7$-
- $n\text{-}C_6H_{13}$-
- $n\text{-}C_{10}H_{21}$-
- $C_6H_5$-
- α-naphthyl-
- $C_6H_5CH_2$-
- $C_6H_5CH_2CH_2$-
- $p\text{-}CH_3C_6H_4CH_2CH_2$-
- 2,4,6-$(CH_3)_3C_6H_2$-
- $p\text{-}(CH_3)_2CHC_6H_3$-

EXAMPLE II

A solution of 6.3 g. (0.05 mole) of isomaltol in 25 ml. of acetic anhydride is heated at 95° C. for 5 hours. The excess acetic anhydride is then removed under vacuum and the residue is recrystallized from ether to provide 4.9 g. of 2-acetyl-3-acetoxyfuran; M.P. 36–38° C.

Using the appropriate starting materials, 2-acetyl-3-acetoxy-5-methylfuran is similarly prepared according to the above procedure.

EXAMPLE III

A solution of 50.4 g. (0.40 mole) of isomaltol, 65 g. (0.50 mole) of propionic anhydride, and 0.5 ml. of pyridine is refluxed for 48 hours in 200 ml. of n-hexane. The mixture is then cooled at 0° C. for 12 hours. Filtration of the cooled mixture provides 59 g. of 2-acetyl-3-propionoxyfuran; M.P. 50–52° C.

Using the appropriate starting materials, 2-acetyl-3-propionoxy-5-methylfuran is similarly prepared according to the above procedure.

EXAMPLE IV

To 0.10 mole of isomaltol in about 200 ml. of pyridine at 0° C. is added dropwise, over a period of 30 minutes, 0.11 mole of benzoyl chloride. The reaction mixture is warmed to 25° C. and kept at this temperature for about 16 hours. The pyridine is removed under vacuum and the 2-acetyl-3-benzoxyfuran is recrystallized from an appropriate solvent; M.P. 98–100° C.

Using the appropriate starting materials, 2-acetyl-3-benzoxy-5-methylfuran is similarly prepared according to the above procedure.

EXAMPLE V

Using the procedure of Example IV and the appropriate starting materials, the following compounds are prepared:

| $R^1$ | $R^3$ | $R^3$ |
|---|---|---|
| $CH_3$— | $n\text{-}C_3H_7$— | $n\text{-}C_4H_9$— |
| $CH_3$— | $n\text{-}C_{10}H_{21}$— | $n\text{-}C_6H_{13}$— |
| $n\text{-}C_4H_9$— | $CH_3$— | $n\text{-}C_{10}H_{21}$— |
| $n\text{-}C_6H_{13}$— | $C_6H_5$— | α-naphthyl— |
| $C_6H_5$— | $CH_3$— | $C_6H_5CH_2$— |
| $C_6H_4CH_2$— | α-naphthyl— | $C_6H_5CH_2CH_2$— |
| $p\text{-}CH_3C_6H_4CH_2$— | $n\text{-}C_6H_{13}$— | $p\text{-}CH_3C_6H_4CH_2CH_2$— |
| $n\text{-}C_{10}H_{21}$— | $p\text{-}CH_3C_6H_4$— | 2,4,6-$(CH_3)_3C_6H_2$— |
| $n\text{-}C_8H_{17}$— | $p\text{-}CH_3C_6H_4CH_2$— | $p\text{-}(CH_3)_2CHC_6H_4$— |
| α-napthtyl— | $p\text{-}(CH_3)_2CHC_6H_4$— | |
| 2,4,6-$(CH_3)_3C_6H_2$— | $n\text{-}C_3H_7$— | |
| $p\text{-}CH_3C_6H_4CH_2CH_2$— | $n\text{-}C_4H_9$— | |
| $p\text{-}(CH_3)_2CHC_6H_4$— | $i\text{-}C_3H$ — | |
| $C_2H_5$— | 2,4,6-$(CH_3)_3C_6H_2$— | |

EXAMPLE VI

A 10 mg. sample of isomaltol is placed in the center of the cover of an inverted Petri dish containing potato dextrose agar, which has been inoculated at the center of the dish with the fungus to be tested. The agar dish is inoculated with the fungus by triturating an appropriate fungus slant by means of a standard wire loop with 2 ml. of sterile water and then contacting the center of the agar dish with the loop, care being taken that a sufficient number of spores are transported to the agar. The sample and a control is then inoculated at 28° C. for 6 days. The results are given below.

|  | Diameter of colony size (mm.) | |
|---|---|---|
|  | Control sample | Sample plus isomaltol |
| Fungus: |  |  |
| Phytophthora citrophthora | 20 | 0 |
| Sclerotina fructicola | 75 | 0 |
| Botrytis cinerea | 55 | 0 |
| Geotrichum candidum | 40 | 0 |
| Alternaria citri | 45 | 0 |
| Diplodia natelensis | 43 | 0 |
| Penicilium digitatum | 31 | 0 |
| Aspergillus niger | 50 | 0 |
| Fusarium oxysporum | 39 | 0 |
| Phomopsis citri | 35 | 0 |
| Thielaviopsis paradoxa | 82 (entire plate) | 0 |
| Glomerella cingulata | 42 | 0 |
| Rhizopus stolonifera | 82 (entire plate) | 0 |
| Gloesporium musarium | 50 | 0 |
| Thielaviopsis paradoxa | 82 (entire plate) | 0 |
| Pullularia pullulans | 31 | 0 |
| Alternaria solani | 34 | 0 |
| Trichoderma viride | 82 (entire plate) | 0 |

Excellent fungicidal activity is also obtained when the compounds of Examples I(B) and II–V are used instead of isomaltol.

EXAMPLE VII

The technique of Example VI was carried out against *Penicillium digitatum*, using 2-acetyl-3-hydroxy-5-methylfuran. In the presence of this compound there was no growth or sporulation, while the control sample exhibited a colony diameter of 38 mm. and heavy sporulation.

Analogous results are obtained with isomaltol and the compounds of Examples I(B) and II–V.

EXAMPLE VIII

The procedure of Example VI is used with the bacteria and yeast listed below. The technique used is exactly as described in Example VI.

|  | Diameter of colony size (mm.) | |
|---|---|---|
|  | Control sample | Sample plus isomaltol |
| Bacterium: |  |  |
| Salmonella choleraesius | 1 | 0 |
| Bacillus subtilis | 22 | 0 |
| Staphylococcus aureus | 10 | 0 |
| Erwinia carotovora | 12 | 0 |
| Aerobacter aerogenes | 12 | 0 |
| Pseudomonas aeruginosa | 10 | 7 |
| Escherichia coli | 10 | 0 |
| Yeast: |  |  |
| Hansenula anomala | 15 | 0 |
| S. cerevisiae var. ellipsoides | 9 | 0 |

Excellent results are also obtained when the compounds of Examples I(B) and II–V are used in these tests.

EXAMPLE IX

A series of Petri dishes are filled with Brain-Heart-Infusion agar and a suspension of a bacterium from the list below is streaked twice across the entire surface of the agar (82 mm.) with a standard wire loop making an "X." A 10 mg. sample of isomaltol is placed in the center of the cover of the inverted Petri dish which is then inoculated at 37° C. for 24 hours. The zone of inhibition about the center of the dish is then measured. Typical results are given in the table below.

| Bacterium [1]: | Diameter of inhibition zone at center of plate (mm.) |
|---|---|
| Salmonella choleraesius | 35 |
| Bacillus subtilis | 30 |
| Staphylococcus aureus | 40 |
| Erwinia carotovora | 25 |
| Aerobacter aerogenes | Slight |
| Pseudomonas aeruginosa | 0 |
| Escherichia coli | 10 |

[1] Control samples grew over the entire plate (82 mm.).

When the compounds in Examples I(B) and II–V are used in the above tests excellent results are obtained.

EXAMPLE X

Two sets of Petri dishes were prepared with potato dextrose agar containing 10 mcg./ml. and 100 mcg./ml. of 2-acetyl-3-hydroxy-5-methylfuran respectively; and inoculated with a series of post-harvest fungi. The inoculated plates, together with a series of control plates without added compound, were incubated at 37° C. for 24 hours. The results are given below.

|  | Control of fungi growth [1] | |
|---|---|---|
|  | 100 mc./ml.[2] | 10 mcg./ml.[3] |
| Fungus: |  |  |
| Phytophthora citrophthora | − | + |
| Sclerotina fructicola | − | ++ |
| Botrytis cinera | − | + |
| Geotrichum candidum | + | ++ |
| Aternaria citri | ([4]) | +++ |
| Diplodia natelensis | + | +++ |
| Penicillium digitatum | + | ++ |
| Aspergillus niger | ++ | +++ |
| Fusarium okysporum | + | +++ |
| Phomopsis citri | + | ++ |
| Thielaviopsis paradoka | + | ++ |
| Glomerella cingulata | ++ | ++ |
| Rhizopus stolonifera | ++ | +++ |
| Gloesporium musarium | + | ++ |
| Thielaviopsis paradoka | ++ | +++ |

[1] Growth of control=++++; Each + in above table is equal to a growth of 25% of control.
[2] Prepared by adding 10 mg. of compound to a mixture of 9 ml. of water and 1 ml. of ethanol and then mixing 1 ml. of this stock solution with 9 ml. of potato dextrose agar.
[3] Prepared by diluting 1 ml. of the stock solution in (2) to 10 ml. and then mixing 1 ml. of this solution with 9 ml. of the potato dextrose agar.
[4] Trace.

Analogous results are obtained with isomaltol and the other compounds of Examples I(B) and II–V above.

EXAMPLE XI

The minimum inhibitory concentration (MIC) of isomaltol against various fungi was determined by a procedure similar to that described in Example VI. The results are given in the table below. The 10 mg. samples were measured out directly, while the smaller samples were obtained by taking aliquots of a standard methanol solution of isomaltol, making the appropriate dilutions, and placing a one ml. portion of the resultant solution on the cover of an inverted Petri dish.

| Fungus: | Minimum inhibitory concentration (mg.) |
|---|---|
| Trichophyton violaceum | 0.1 |
| Trichophyton mentagrophytes | 0.01 |
| Trichophyton mentagrophytes | 0.1 |
| Microsprum audouini | 0.1 |
| Microsprum canis | 1 |
| Microsprum gypseum | 0.01 |
| Microsprum canis | 0.1 |
| Trichophyton equinum | 0.01 |
| Blastomyces brasiliensis | 0.01 |
| Blastomyces deramtitidis | 1 |
| Sporotrichum schenkii | 10 |
| Cryptococcus neoformans | 10 |
| Candida albicans | 10 |
| Candida albicans | 10 |
| Pityrosporum ovale | 10 |
| Pityrosporum ovale | 10 |
| Saccharomyces cereviase | 10 |
| Fusarium oxysporum B | 0.01 |
| Fusarium oxysporum F | 0.01 |
| Fusarium oxysporum | 0.1 |
| Botrytis allii | 0.01 |
| Torulopsis albiola | 0.1 |
| Aspergillus niger | 0.1 |
| Penicillum funiculosum | 1 |

Excellent results are also obtained with the compounds of Examples I(B) and II–V.

EXAMPLE XII

To each of two 4 x 4-inch pieces of paper were added 1 ml. of a 0.1 gram/ml. aqueous solution of isomaltol. One sheet was packed on the bottom of a quart box of strawberries (about 595 grams net) and the other on top of the strawberries. Several boxes of strawberries, treated in the same manner, were stored at room temperature (about 25° C.) in a storage cellar. After 10 days storage, the strawberries were free of mold growth and spoilage while boxes of strawberries, picked at the same time and stored under the same conditions in a separate storage area to avoid inadvertently contacting the control berries with isomaltol, showed visible mold growth and spoilage.

The same treatment, 0.2 gram isomaltol per 1.3 pound box, was given to boxes of blueberries and raspberries. Berries so treated were found free of spoilage after storage for 10 days in a storage cellar at 25° C. Control boxes of blueberries and raspberries stored under the same conditions but in a separate cellar to avoid contact with isomaltol in the air, were found to be moldy and spoiled after 3 days.

Similar results are obtained with the compounds in Examples I(B) and II–V.

EXAMPLE XIII

Oranges were inoculated by scratching the surface of the fruit and dipping in a suspension of *Penicillium digitatum* spores. The fruit was stored at room temperature (about 25° C.) for 24 hours and then dipped in a 0.1% aqueous solution of isomaltol. The treatment was calculated to be about 0.01 gram of isomaltol per 100 grams of oranges. The fruit was stored in cardboard cartons at 20° C. for eleven days. Examination showed 70% less decay than inoculated control samples which were not treated with isomaltol and which were stored under the same conditions.

Similar results are obtained with the compounds listed in Examples I(B) and II–V.

EXAMPLE XIV

Californian Emperor grapes were stored at 40° F. for five months in the presence of isomaltol. All the grapes were dehydrated because of poor humidity control but, while the control grapes were completely covered with Botrytis mold, the grapes treated with isomaltol (0.2 g./250 g. grapes) were completely free of mold spoilage.

California Emperor grapes were stored at 40° F. for three months with better humidity control.

Isomaltol treatment:        Marketability, percent
None _____ 0 (very heavy mold).
0.1 g./250 g. of grapes ___ 100 (excellent condition).
0.2 g./250 g. of grapes ___ 100 (color faded slightly).
0.4 g./250 g. of grapes ___ 75 (some color fading).
0.8 g./250 g. of grapes ___ 25 (extensive color fading).

None of the isomaltol-treated grapes showed mold growth.

In another experiment Chilean Emperor grapes that contained a heavy natural infection (mold and yeast) were stored at room temperature for one week. The controls became completely unmarketable while grapes treated at a level 0.1 g./250 g. of grapes were still 85% marketable and those treated at a level of 0.2 g./250 g. of grapes were 95% marketable.

Comparable results are obtained with the compounds listed in Examples I(B) and II–V.

EXAMPLE XV

South African Barlinka grapes were exposed to varying amounts of isomaltol and $SO_2$ during transit from South Africa to the United States. These grapes are normally shipped in 10 lb. boxes with individually, paper-wrapped one pound bunches (10 in all) protected from damage by wooden excelsior. The boxes in all treatments except C and M in the table below were lined with polyethylene (indicated by P in the table below). Sulfur dioxide was applied in TP and M by spraying the top layer of excelsior with the solution of sodium metabisulfite. Treatment M is the standard for shipment. The groups in all treatments but C, CP, and M were inoculated by placing a Botrytis-infected berry into each bunch. Ten boxes of grapes were used for each treatment. The test grapes were pre-cooled after treatment and shipped by refrigerated boat from South Africa to the United States, where they arrived at the test site a little more than 6 weeks later. At the test site they were held at 75–80° F. Decay evaluations were made on each of four boxes per treatment after 1 and 3 days' storage at 75–80° F. and the remaining two boxes after 7 days. Decay data were taken by weighing the grapes before and after removal of rotted berries and recording percentage sound fruit. This method also provided some observations on weight differences between plastic-lined and non-lined treatments. Only visual observations were made on such items as stem condition, shattering, and chemical injury. The objective data were analyzed statistically.

A comparison test was made in South Africa with the same treatment. Data including decay, stem condition, and $SO_2$ damage were taken on 10 replicates after holding the grapes for 7 days at 50° F.

The results are outlined in the tables below.

The treatments were as follows: C=Field check; CP=Field check; IP=Inoculated check; KP=Kraft paper overwarp impregnated with 0.82 g. isomaltol/ft.$^2$ (32 g./box); 0.05 P=0.05 g. isomaltol/individual wrap (0.5 g./box); 0.10 P=0.10 g. isomaltol/individual wrap (1.0 g./box); 0.30 P=0.30 g. isomaltol/individual wrap (3.0 g./box); 0.05 KP=KP above plus 0.05 g./individual wrap (3.7 g./box); TP=2-ml. 10% Sodium meta-bisulfite/box plus 12 $SO_2$ tablets/box; and M=20 ml. 38% Sodium meta-bisulfite/box.

TABLE 1.—EVALUATION OF BARLINKA GRAPES SHIPPED TO THE UNITED STATES

| Treatment | Percent sound berries after— | | |
|---|---|---|---|
| | 1 day | 3 days | 7 days |
| C [a] | 91 | 89 | 84 |
| CP [a] | 89 | 74 | 66 |
| IP | 67 | 45 | 30 |
| KP [b] | 98 | 96 | 93 |
| .05 P | 83 | 80 | 74 |
| 0.1 P | 89 | 83 | 79 |
| 0.3P [b] | 98 | 96 | 93 |
| 0.05 KP | 94 | 91 | 87 |
| TP | 90 | 85 | 78 |
| M [a] | 98 | 94 | 92 |

[a] Not inoculated.
[b] An analysis of variance of the data shows that there was significantly less decay at a 95% confidence level with these treatments compared with any other treatments that used inoculated berries.

TABLE 2.—EVALUATION OF DECAY, STEM CONDITION, AND $SO_2$ DAMAGE ON BARLINKA GRAPES IN TESTS CONDUCTED IN THE REPUBLIC OF SOUTH AFRICA

| Treatment | Percent sound berries | Stem condition | | | | Percent $SO_2$ damage |
|---|---|---|---|---|---|---|
| | | 100% green | 66-100% green | 33-66% green | 0-33% green | |
| C [a] | 95 | 44 | 41 | 13 | 2 | |
| CP [a] | 91 | 89 | 10 | 1 | 0 | |
| IP | 68 | 68 | 32 | 0 | 0 | |
| KP | 91 | 78 | 21 | 1 | 0 | |
| 0.05 P | 82 | 71 | 26 | 3 | 0 | |
| 0.1 P | 89 | 79 | 21 | 0 | 0 | |
| 0.3 P | 92 | 84 | 16 | 0 | 0 | |
| 0.05 KP | 92 | 81 | 19 | 0 | 0 | |
| TP | 94 | 85 | 15 | 0 | 0 | 4 |
| M [a] | 98 | 45 | 46 | 8 | 1 | 2 |

[a] Berries were not inoculated.

EXAMPLE XVI

To each of two 4 x 4-inch pieces of paper were added 1 ml. of a 0.1 gram/ml. aqueous solution of isomaltol.

One sheet was packed on the bottom of a quart box of strawberries and the other on top of the berries. The berries were stored under refrigeration (about +5 to +10° C.) and were free of spoilage after three weeks. Control boxes of strawberries stored under the same conditions but without the isomaltol treatment, were 30% spoiled within one week of storage.

Similar results are obtained with the compounds of Examples I(B) and II–V.

EXAMPLE XVII

Ten one-pound bunches of fresh asparagus were sprayed with one liter of a 4.5% aqueous solution of isomaltol to give about a 0.1 weight percent application. A commercial compressed air sprayer was used to apply the solution. The asparagus was stored in a cool cellar at about 20° C. The treated bunches showed no evidence of spoilage after two weeks storage. Control bunches of fresh asparagus stored under the same conditions were 30% spoiled after two weeks.

Similar results are obtained with the compounds of Examples I(B) and II–V.

EXAMPLE XVIII

Four aqueous solutions were prepared containing respectively, 0.1 weight percent of the sodium, salt, the potassium salt, the secondary butylamine salt and the ammonium salt of isomaltol. Fifteen, one-pound samples of shredded coconut were sprayed with the solution of the salts of isomaltol so that each pound contained 0.01% isomaltol calculated from the salt solution. Three samples were prepared for each salt treatment and three samples were untreated controls. Each sample was put in a paper box and stored at room temperature. The treated samples were found to be free of spoilage after three months, while the untreated control samples of coconut were found to be spoiled after two weeks storage.

Similar results are obtained with the salts of the compounds of Example I(B).

EXAMPLE XIX

A chocolate cake batter was prepared by combining 187 grams of cake flour, 303 grams sugar, 70 grams melted chocolate, 4 grams baking powder, 4 grams baking soda, 4 grams salt, 100 grams shortening, 245 grams whole milk, 2 grams vanilla extract and 96 grams of whole egg. To the mixed batter was added 0.1 grams of isomaltol as 10 ml. of a 1% aqueous solution. The batter was re-mixed for three minutes and baked at 350° F. for 30 minutes. After storage at room temperature for 14 days the treated cake showed no mold growth. An untreated cake prepared from the same batter without the addition of isomaltol, showed mold growth after 7 days storage at room temperature. The dosage level is about 0.1% on the batter weight.

Acceptable results are also obtained with the compounds of Examples I(B) and II to V.

EXAMPLE XX

Samples of meat-type dog food (20–25% moisture content) containing 0.15% by weight of isomaltol, added as a 50% ethanol solution, were inoculated with a mixed culture of yeasts and fungi obtained from a sample of spoiled dog foods, and stored at room temperature. No microbial growth developed in these samples after a 30-day storage period. Untreated control samples became moldy and spoiled within one week.

Comparable results are also obtained with the compounds listed in Examples I(B) and II to V.

The experiment was repeated using 0.1% isomaltol sodium salt as a 10% aqueous solution. The dog food samples were inoculated with the mixed culture and stored at room temperature. No microbial growth developed in these samples after a 30-day storage period. An untreated control sample inoculated at the same time became moldy and spoiled within one week.

EXAMPLE XXI

To a one liter of fresh, unpasteurized prune juice was added sufficient isomaltol to give a total of 0.01% by weight. The prune juice did not develop microbial growth after two weeks storage at about 25° C. An untreated control sample developed microbial growth within four days under the same storage conditions.

EXAMPLE XXII

One hundred grams of Diamond 40 [1] polyvinyl chloride resin, 65.1 parts per hundred parts resin of dioctyl phthalate plasticizer, 2 parts of Mark QED [2] and 1 part Mark 34 [3] stabilizers were milled o na 2-roll plastic mill for 2 min. at a mill temperature of 260–275° F. and at a friction ratio of 1.4/1.0. One part of isomaltol per hundred parts resin was added to the rollers and milled in for 3 minutes. The rollers were set for 5 mil and the vinyl film was sheeted off the rollers. The film was calculated to contain isomaltol at 0.007 mg./in. The film was used to wrap six half-pound boxes of raspberries which were inoculated with *Botrytis cinera*. Six boxes of raspberries, similarly inoculated, were wrapped in Dow Handiwrap [4]. The twelve boxes were stored at 20° C. on an open shelf. The berries wrapped in the untreated film spoiled within 2 days. The berries wrapped in the film containing isomaltol were unspoiled after 5 days storage. The level of treatment was calculated to be about 0.5 mg. of isomaltol per half-pound of berries or about 0.01%.

Substantially the same results are obtained when the above experiment is repeated with the compounds in Examples I(B) and II to V.

EXAMPLE XXIII

The procedure of Example XXII was repeated using Marlex 3328 [5] polyethylene resin, Escon 114 [6] polypropylene resin and remilled Saran Wrap [7]. Boxes of raspberries and strawberries were wrapped in the treated films and were found to resist spoiling for 2 to 3 times the storage periods of berries wrapped in untreated films.

EXAMPLE XXIV

An effective dusting powder formulation for use in the treatment of athlete's foot is given below:

| | Percent |
|---|---|
| Isomaltol | 3.0 |
| Talc, U.S.P. | 86.9 |
| Magnesium stearate, U.S.P. | 5.0 |
| Zinc stearate, U.S.P. | 5.0 |
| Perfume | 0.1 |
| Total | 100.0 |

The concentration of isomaltol in the above preparation can be varied from 0.1 to 10%.

The compounds of Examples I(B) to II–V are used to prepare similar dusting powder formulations.

These preparations are applied directly to the affected areas of the foot, e.g., dusting or spraying between the toes. In addition, the powder can be applied directly to the footwear of the patient.

---

[1] Diamond 40, trademark of Diamond Alkali Company.
[2] Mark QTD, trademark of Argus Chemical Corporation.
[3] Mark 34, trademark of Argus Chemical Corporation.
[4] Handiwrap, trademark of Dow Chemical Company.
[5] Marlex 3328, trademark of Phillips Petroleum Company for polyethylene resin.
[6] Escon 114, trademark of Enjay Chemical Company for polypropylene resin.
[7] Saran Wrap, trademark of Dow Chemical Company for polyvinyl chloridepolyvinylidene chloride copolymer film.

EXAMPLE XXV

Two effective aerosol formulations useful in the treatment of athlete's foot are given below:

| Aerosol spray: | Percent |
|---|---|
| Isomaltol | 0.3 |
| Eethyl alcohol | 9.5 |
| Perfume | 0.2 |
| Freon Propellants 12/11 (40:60) * | 90.0 |
| Total | 100.0 |

*Freon 11 and Freon 12 are respectively trichlorofluoromethane and dichlorofluoromethane.

| Isomaltol-talc aerosol spray: | Percent |
|---|---|
| Isomaltol | 0.3 |
| Talc, U.S.P. | 9.5 |
| Perfume | 0.2 |
| Freon Propellants 12/11 (40:60) | 90.0 |
| Total | 100.0 |

Additional effective formulations are obtained by replacing the isomaltol in the above preparation by the compounds of Examples I(B) and II to V.

EXAMPLE XXVI (A) A water insoluble ointment for topical application in the treatment of athlete's foot is prepared according to the following formulation:

| | Grams |
|---|---|
| Cholesterol | 30 |
| Stearyl alcohol | 30 |
| White wax | 80 |
| White petrolatum | 860 |
| Isomaltol | 90 |

(B) A water soluble ointment for topical treatment is composed of:

| | Grams |
|---|---|
| Polyethylene glycol (M.W. 4000) | 4000 |
| Polyethylene glycol (M.W. 400) | 800 |
| Isomaltol | 100 |

The above ointments are formulated using techniques well known to those skilled in the art.

Effective ointments are obtained by replacing the isomaltol in the above formulations with the compounds of Examples I(B) and II to V.

EXAMPLE XXVII

A cream preparation for topical application of active agent is prepared according to the following formulation:

| | |
|---|---|
| Cetyl alcohol, grams | 10 |
| Stearyl alcohol, grams | 10 |
| Sodium lauryl sulfate, grams | 1.5 |
| White petrolatum, ml. | 30.0 |
| Propylene glycol, ml. | 10.0 |
| Distilled water to make total of, grams | 100.0 |
| Isomaltol, grams | 5 |

The compounds of this invention are useful in topical preparations in concentrations of from about 0.01% to about 10%, preferably from about 1% to about 5%.

These preparations are formulated according to standard techniques. Effective ointments are also obtained by replacing the isomaltol in the above formulations with the compounds of Examples I(B) and II to V.

EXAMPLE XXVIII

The solutions below are also effective in the treatment of athlete's foot when topically administered.

2 grams of isomaltol in 100 ml. of ethanol.
2 grams of isomaltol in 100 ml. of isopropanol.
3 grams of 2-acetyl-3-propionoxyfuran in 100 ml. of a 1:1 (vol./vol.) mixture of ethanol and water.
2 grams of 2-acetyl-3-hydroxy-5-methylfuran in 150 ml. of glycerine.

What is claimed is:

1. A method of inhibiting microbial growth selected from the group consisting of bacterial, fungi and yeasts, which comprises applying to the habitat of said organisms a growth-inhibiting concentration of a compound selected from the group consisting of those having the formulae:

[structure: furan ring with $CH_3$ substituent, $OCOR^2$ group, and $C(O)-R^1$ group]

and

[structure: furan ring with $OCOR^2$ group and $C(O)-CH_3$ group]

wherein $R^1$ is selected from the group consisting of alkyl, phenyl, naphthyl, phenalkyl and alkylphenyl of up to 10 carbon atoms; and $R^2$ is selected from the group consisting of alkyl, phenyl, naphthyl, phenalkyl and alkylphenyl of up to 10 carbon atoms, and hydrogen.

2. The method of claim 1 wherein the compound is applied to the microbial habitat in the form of its vapor.

3. The method of claim 1 wherein the compound is applied to the microbial habitat as a solution.

4. The method of claim 1 wherein said microbial habitat is a processed foodstuff and the amount of said compound is about 0.01 to 0.10% based on the weight of said foodstuff.

5. The method of claim 1 wherein said habitat is a fruit or vegetable and the amount of said compound is about 0.01 to 0.15% based on the weight of the foodstuff.

6. The method of claim 5 wherein the compound is applied in its vapor phase.

7. The method of claim 1 wherein said microbial habitat is an animal feed and from about 0.01 to 0.15% by weight of the compound is employed.

8. A method of alleviating the symptoms of athlete's foot which comprises topically administering to the foot of a subject suffering from athlete's foot an effective alleviating amount of a compound selected from the group consisting of those having the formulae:

[structure: furan ring with $CH_3$ substituent, $OCOR^2$ group, and $C(O)-R^1$ group]

and

[structure: furan ring with $OCOR^2$ group and $C(O)-CH_3$ group]

wherein $R^1$ is selected from the group consisting of alkyl, phenyl, naphthyl, phenalkyl and alkylphenyl of up to 10 carbon atoms; and $R^2$ is selected from the group consisting of alkyl, phenyl, naphthyl, phenalkyl and alkylphenyl of up to 10 carbon atoms, and hydrogen.

9. An antifungal, antibacterial or anti-yeast composition comprising an effective amount of a compound selected from the group consisting of those having the formulae:

[structure: furan ring with $CH_3$ substituent, $OCOR^2$ group, and $C(O)-R^1$ group]

and

[structure: furan ring with $OCOR^2$ group and $C(O)-CH_3$ group]

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and a topically administrable ointment base.

10. An antifungal, antibacterial or anti-yeast composition comprising an effective amount of a compound selected from the group consisting of those having the formulae:

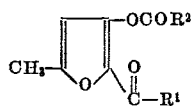

and

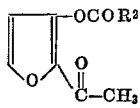

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and talc.

11. An antifungal, antibacterial or anti-yeast composition comprising an effective amount of a compound selected from the group consisting of those having the formulae:

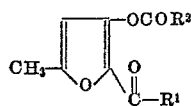

and

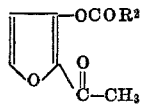

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and a topically administrable dusting powder.

12. An antifungal, antibacterial or anti-yeast composition comprising an effective amount of a compound selected from the group consisting of those having the formulae:

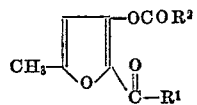

and

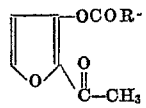

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and a topically administrable cream.

13. An antifungal, antibacterial or anti-yeast composition comprising an effective amount of a compound selected from the group consisting of those having the formulae:

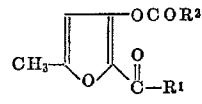

and

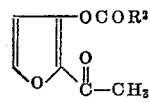

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and a topically administrable glycerin solution.

14. An antifungal, antibacterial or anti-yeast composition comprising an effective amount of a compound selected from the group consisting of those having the formulae:

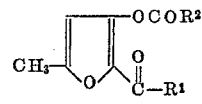

and

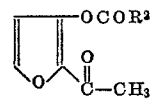

wherein R¹ is selected from the group consisting of alkyl, phenyl, naphthyl, phenalkyl and alkylphenyl of up to 10 carbon atoms; and R² is selected from the group consisting of alkyl, phenyl, naphthyl, phenalkyl and alkylphenyl of up to 10 carbon atoms and hydrogen; and a topically administrable aerosol spray.

References Cited

UNITED STATES PATENTS 3,015,654  1/1962  Hodge et al. _____ 260—210
3,054,805  9/1962  Hodge et al. _____ 260—345.9

OTHER REFERENCES

Hodge et al.: Cereal Chem., vol. 38, 1961, pp. 221–228.
Hodge et al.: Cereal Chem., vol. 38, 1961, pp. 207 and 218.

ALBERT T. MEYERS, Primary Examiner

A. J. ROBINSON, Assistant Examiner

U.S. Cl. X.R.

99—150, 154, 156; 260—347.4; 424—43, 285